(12) United States Patent
Williamson

(10) Patent No.: US 9,097,077 B2
(45) Date of Patent: Aug. 4, 2015

(54) DOWNHOLE CHEMICAL DELIVERY SYSTEM AND METHOD

(75) Inventor: Don Williamson, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 386 days.

(21) Appl. No.: 12/609,373

(22) Filed: Oct. 30, 2009

(65) Prior Publication Data

US 2011/0100634 A1     May 5, 2011

(51) Int. Cl.
| | |
|---|---|
| E21B 43/28 | (2006.01) |
| C09K 8/536 | (2006.01) |
| E21B 27/02 | (2006.01) |
| C09K 8/03 | (2006.01) |
| C09K 8/516 | (2006.01) |
| C09K 8/70 | (2006.01) |

(52) U.S. Cl.
CPC . *E21B 27/02* (2013.01); *C09K 8/03* (2013.01); *C09K 8/516* (2013.01); *C09K 8/70* (2013.01)

(58) Field of Classification Search
CPC .......... E21B 37/06; E21B 43/28; C09K 8/536
USPC ................................. 166/305.1, 310, 376, 317
See application file for complete search history.

(56) References Cited

U.S. PATENT DOCUMENTS

| | | | |
|---|---|---|---|
| 4,611,664 A | 9/1986 | Osterhoudt, III et al. | |
| 4,657,784 A | 4/1987 | Olson | |
| 4,790,386 A * | 12/1988 | Johnson et al. | 166/310 |
| 5,505,740 A | 4/1996 | Kong et al. | |
| 5,658,861 A | 8/1997 | Nelson et al. | |
| 5,716,923 A | 2/1998 | MacBeath | |
| 5,910,322 A | 6/1999 | Rivett et al. | |
| 6,394,185 B1 * | 5/2002 | Constien | 166/296 |
| 6,655,475 B1 | 12/2003 | Wald | |
| 7,204,312 B2 | 4/2007 | Roddy et al. | |
| 7,419,937 B2 | 9/2008 | Rimmer et al. | |
| 2004/0014607 A1 | 1/2004 | Sinclair et al. | |
| 2004/0238173 A1 * | 12/2004 | Bissonnette et al. | 166/307 |
| 2005/0072570 A1 * | 4/2005 | Lehman et al. | 166/304 |
| 2005/0167104 A1 | 8/2005 | Roddy et al. | |
| 2008/0023203 A1 | 1/2008 | Steiner | |
| 2008/0156498 A1 * | 7/2008 | Phi et al. | 166/376 |
| 2008/0296024 A1 * | 12/2008 | Huang et al. | 166/311 |
| 2009/0188718 A1 * | 7/2009 | Kaageson-Loe et al. | 175/40 |

FOREIGN PATENT DOCUMENTS

| | | |
|---|---|---|
| WO | 0212674 | 2/2002 |
| WO | 2007086771 | 8/2007 |

* cited by examiner

*Primary Examiner* — Catherine Loikith
(74) *Attorney, Agent, or Firm* — Rachel E. Greene; Tim Currington

(57) ABSTRACT

A method for delivering a chemical composition downhole into a wellbore includes forming a cylindrical body including a treatment chemical, where the cylindrical body includes a flow channel therethrough. The method further includes positioning the cylindrical body into a fluid conduit of a wellbore, and flowing a release fluid through the flow channel to release at least part of the treatment chemical into the release fluid. The release fluid causes the release of the treatment chemical by dissolving the chemical, and/or by removing a coating on the chemical through dissolution, response to pH adjustment, and/or response to an abrasive material in the release fluid. Examples of a treatment chemical include a cross-linker, breaker, fluid loss pill agent, and an encapsulated chemical.

32 Claims, 4 Drawing Sheets

DOWNHOLE CHEMICAL DELIVERY SYSTEM AND METHOD

BACKGROUND

The technical field generally relates to delivering chemicals downhole in a wellbore. Certain types of chemicals are preferentially mixed at a treatment location or close to the treatment location. For example, certain mixed chemicals produce strong acids or have highly viscous reaction products, and it may be desirable to minimize equipment contact with the mixed chemicals, or to minimize the operational complexity of mixing and delivering the chemicals. Presently available methods for delivering chemicals directly to a downhole location have drawbacks, including the requirement to prepare for the chemical delivery with special equipment or procedures before the chemical delivery is needed, difficulty in ensuring that the chemicals are delivered to a desired depth, and difficulty in ensuring the chemicals mix at the desired depth. Therefore, further technological developments are desirable in this area.

SUMMARY

One embodiment is a unique method for delivering and mixing chemicals at a downhole location. Further embodiments, forms, objects, features, advantages, aspects, and benefits shall become apparent from the following description and drawings.

DESCRIPTION OF THE ILLUSTRATIVE EMBODIMENTS

Figure 1:
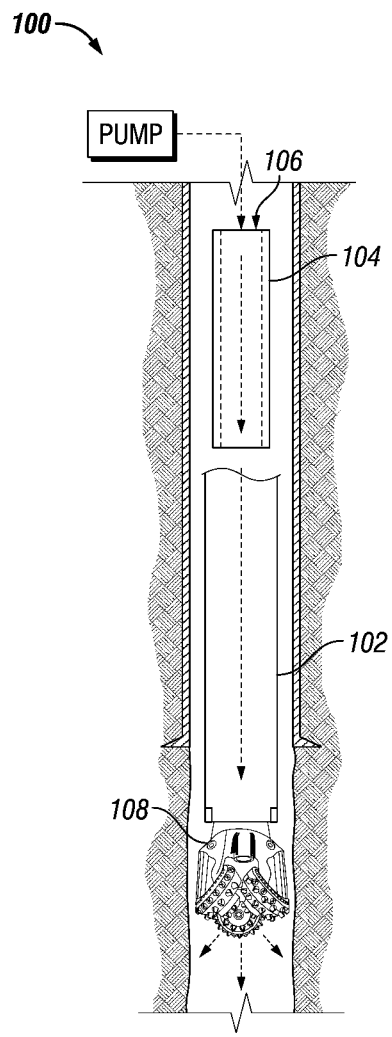
FIG. 1 is a schematic diagram of a system for delivering a chemical to a downhole location in a wellbore.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 includes a fluid conduit 102 of a wellbore. The fluid conduit 102 includes any fluid conduit 102 understood in the art, including at least drill pipe, casing, and/or tubing positioned in the wellbore. The system 100 further includes a cylindrical body 104 that includes a treatment chemical. The cylindrical body 104 is generally cylindrical as an outer geometry of the body, although the cylindrical body 104 may include gaps, markings, or other features which render the outer shape of the cylindrical body 104 not strictly cylindrical. Further, the ends of the cylindrical body 104 are shown consistent with a geometrically right cylinder (i.e. square), but the ends of the cylindrical body 104 may be any shape including at least a cylinder sliced at an angle deviated from 90 degrees. In certain embodiments, the cylindrical body 104 may comprise a cross-sectional shape that is not circular.

The treatment chemical may be any chemical that is desired to be delivered at a downhole location, and may include a polymer cross-linker, a breaker, an acid or an acid precursor, a polyacrylamide, a chemical that contributes to the formation of (or that forms) a fluid loss pill in the surrounding fluid when released, an encapsulated chemical, and/or a coated chemical. Other non-limiting examples of the treatment chemical include sodium hydroxide, fumaric acid, a granular acid, a borate cross-linker, and/or a zirconium cross-linker. The solid state of the chemical references the bulk solidity of the cylindrical body 104. The treatment chemical may be in a solid state and, upon release to the surrounding fluid, the treatment chemical may go into solution, become a gas, and/or remain solid. In certain embodiments, the treatment chemical may be found within solid particles in a liquid state, a gas state, and/or an adsorbed material within the solid particles. In certain embodiments, the cylindrical body 104 further includes a soluble substrate where the treatment chemical is formed with the soluble substrate. The soluble substrate is a material that, under specified conditions including temperature, pH values, and/or in the presence of certain solvents (e.g. and without limitation—water, xylene, acetone, or any other solvent understood in the art) dissolves partially or completely, exposing or releasing the treatment chemical to the surrounding fluid. In certain embodiments, the soluble substrate dissolves over a period of time in the fluids already present (or planned to be present) in the wellbore (e.g. the drilling fluid, hydraulic fracture treatment fluid, gravel pack treatment fluid, etc.), and the release fluid is therefore the fluid already present in the wellbore.

Figure 4:
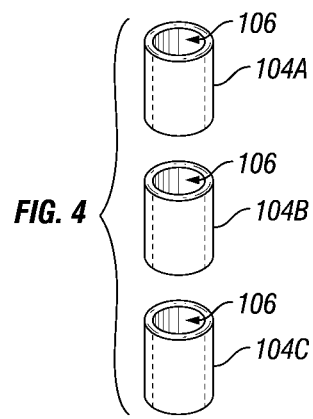
FIG. 4 is an illustration of an alternate embodiment of a plurality of cylindrical bodies.

The cylindrical body 104 includes a flow channel 106 therethrough, and an outer diameter sized to fit within the fluid conduit 102. The overall volume of the cylindrical body 104 depends upon the amount of the treatment chemical to be delivered downhole, and the amount of the cylindrical body 104 that is expected to dissolve or otherwise disperse into the downhole fluid within the time of the treatment. The cross-sectional area of the cylindrical body 104 that is not the flow channel 106 controls a part of the volume, and the length of the cylindrical body 104 controls another part of the volume. The cross-sectional area is limited by the diameter of the fluid conduit 102 and the desired pressure drop for the desired fluid flow rate through the flow channel 106. The length of the cylindrical body 104 can be increased to achieve a desired volume. Further, additional cylindrical bodies 104a, 104b, 104c (reference FIG. 4) can be provided to increase the amount or mix of the treatment chemicals delivered downhole.

Figure 2:
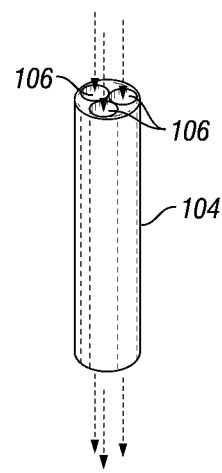
FIG. 2 is an illustration of a cylindrical body.

The rate of delivery of the treatment chemical into the fluid downhole depends upon a number of factors, including the temperature downhole, the strength of the driving force degrading the cylindrical body 104 into the surrounding fluid (e.g. the solubility of the substrate and/or treatment chemical into the surrounding fluid, the pH of the surrounding fluid, the concentration of the substrate or treatment chemical already in the surrounding fluid, etc.), and the mass transfer characteristics of the contact between the surrounding fluid and the cylindrical body 104 (e.g. including the fluid flow speed, turbulence, surface area of contact, etc.). Referencing FIG. 2, the flow channel 106 may include a plurality of flow channels, which may be included for any reason including increasing the surface area of contact between the fluid and the cylindrical body, allowing for easier manufacturing of the cylindrical body 104, control of a fluid flow regime between laminar or turbulent, or for any other consideration understood in the art.

In certain embodiments, the system 100 includes a pump (not shown) fluidly coupled to the fluid conduit 106 on a downstream side and fluidly coupled to a release fluid (not shown) on an upstream side. For example, the pump may be a high pressure, high rate treatment pump for a hydraulic fracture, matrix treatment, and/or drilling fluid circulation treatment. The release fluid is a fluid that releases at least part of the treatment chemical in response to the pump delivering the release fluid through the flow channel 106. In certain embodiments, the release fluid may be a base drilling fluid or treatment fluid with no modifications. The release fluid may be an unsaturated fluid that dissolves the cylindrical body 104 as it is pumped through the flow channel 106. In certain embodiments, the cylindrical body 104 consists of the treatment chemical and a soluble substrate, and the cylindrical body 104 dissolves completely over time with exposure to the release fluid. The release fluid may be a solvent for the treatment chemical and substrate (where the substrate is present), or a fluid having a specified pH where the cylindrical body 104 is soluble in a fluid having the pH of the release fluid.

In one example, the cylindrical body 104 is soluble at a pH that is significantly different than a treating fluid, and the wellbore is treated with the treating fluid. In the example, where it is desired that the chemical be delivered, the release fluid may be delivered as a slug of treatment fluid having the pH to dissolve the cylindrical body 104. In a further example, the treatment chemical may comprise a chemical delivered at the end of a fracture treatment (non-limiting examples of treatment chemicals include a sand control resin, fibers (having a chemical composition) that reduce proppant flowback, or a high concentration breaker), and when conditions consistent with delivering the treatment chemical occur (e.g. an imminent screen-out, the end of the treatment, etc.) then a slug of treatment fluid is delivered to release the treatment chemical.

In an alternate further example, the treatment chemical may comprise a fluid loss control pill pre-cursor, and when conditions necessitating a fluid loss control event occur, a slug of treatment fluid is delivered to release the treatment chemical. In yet another alternate example, multiple cylindrical bodies 104a, 104b, 104c are provided in the fluid conduit 102, wherein each cylindrical body 104a, 104b, 104c is activated under differing conditions. The utilization of multiple cylindrical bodies 104a, 104b, 104c activated under differing conditions allows the use of multiple chemistries delivered downhole under controllable conditions. The multiple chemistries may include different chemicals (e.g. a sand control chemical and a fluid breaking chemical), or may include the same or similar chemicals delivered at different times (e.g. multiple fluid loss control pills that can be delivered selectively, allowing control of multiple fluid loss events at varying times before a drilling operation must be paused to position further cylindrical bodies 104a, 104b, 104c in the fluid conduit 102). The use of multiple cylindrical bodies 104 may include any number of cylindrical bodies 104, including one, two, or more. All examples provided are solely for purposes of illustration and are not limiting.

In certain embodiments, small portions of the cylindrical body 104 may remain after the treatment chemical is delivered to the formation, and the small portions may fall into the rat hole, be circulated out of the wellbore, or be withdrawn as the fluid conduit 102 is removed from the wellbore. In certain embodiments, an activation coating (not shown), responsive to an activator, covers the flow channel 106 and/or other exposed portions of the cylindrical body 104. The release fluid removes at least portions of the activation coating to expose the soluble substrate, or portions of the soluble substrate, as the release fluid flows through the flow channel 106. The use of an activation coating can simplify the selective release of the treatment chemical from the cylindrical body 104, and can further enable more complex systems 100 where multiple cylindrical bodies 104a, 104b, 104c are positioned in the fluid conduit 102 and selectively released. Non-limiting examples of activation coatings and substrates of the cylindrical body 104 include paraffin, soap, salt (e.g. where the release fluid is an unsaturated brine), materials subject to physical dispersion by abrasion, and materials subject to dissolution in either high pH or low pH fluids.

In certain embodiments, the release fluid includes a solvent that dissolves the activation coating and/or the cylindrical body 104. In certain embodiments, the release fluid includes a lowered pH, an elevated pH, a solvent, and/or an abrasive. The composition of the release fluid may be variable, according to whether the release fluid is removing or degrading the activation coating, dissolving the cylindrical body 104, and further according to which cylindrical body 104a, 104b, 104c is selected for treatment chemical release.

Figure 3:
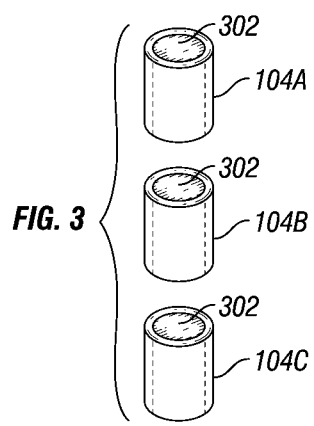
FIG. 3 is an illustration of a plurality of cylindrical bodies having burst disks.

The cylindrical body 104 can include fluid sealing members (not shown) that fluidly isolate fluids above the cylindrical body 104 from fluids below the cylindrical body 104. The fluid sealing members may include fins or gaskets, but the fluid sealing members may simply include a close tolerance between the cylindrical body 104 and the fluid conduit 102. The fluid sealing members may be formed from the treatment chemical and/or the soluble substrate materials making up the cylindrical body 104. In further embodiments, the system includes a burst disk 302 (reference FIG. 3) blocking fluid flow through the flow channel. The burst disk 302 can prevent fluid exchange in the fluid conduit 102 between above and below the cylindrical body 104. Further, the burst disk 302 can assist in efficiently delivering the cylindrical body 104 down the wellbore. The burst disk 302 can be designed to burst at a specified pressure differential, by the strength of the burst disk 302 material or the strength of adhesion material between the burst disk 302 and the cylindrical body 104. In one example, the burst disk 302 is made of aluminum foil of a selected thickness. In certain embodiments, the density of the cylindrical body 104 and/or the pressure drop of fluid flow through the flow channel 106 is utilized to deliver the cylindrical body 104 to the specified depth in the wellbore.

The system 100 further includes a landing feature 108 disposed in the fluid conduit 102. The landing feature 108 in the system 100 of FIG. 1 is a drill collar internal upset 108. The landing feature 108 allows passage of fluid but does not allow passage of the cylindrical body 104 while the cylindrical body 104 remains intact. The landing feature 108 includes any feature allowing the cylindrical body 104 to land, or flow down the wellbore to the position of the feature 108 but not past the feature 108. The landing feature 108 includes, without limitation, a drill bit, a drill collar internal upset, a landing sub, a tubing internal upset, a temporary landing tool, and/or a retrievable landing tool. For example, a temporary or retrievable landing tool may be positioned by a wireline, coiled tubing, or slickline. Any feature 108 that prevents the passage of the intact cylindrical body 104 but not the passage of fluid may be utilized and need not be a feature 108 planned or ordinarily utilized as a landing sub, including for example an object stuck in the fluid conduit 102 where the treatment chemical may be a chemical that is useful in the situation (e.g. a lubricant to loosen the stuck object, a chemical generating a highly viscous plug to isolate the fluid conduit 102 above the stuck object, etc.)

Figure 5:
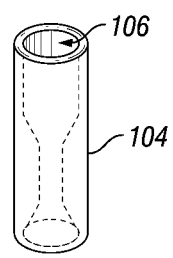
FIG. 5 is an illustration of a cylindrical body having a flow channel including a venturi.

In certain embodiments, the flow channel 106 may be shaped. Referencing FIG. 5, a venturi is provided in the flow channel 106. The shaping of the flow channel 106 can enhance dissolution of the substrate of the cylindrical body 104, and/or enhance mixing of the treatment chemical with the fluid flowing through the flow channel 106. Non-limiting examples of flow channel 106 shapes include an orifice, at least one rifling groove, and/or a turbulence-inducing flow channel shape.

Figure 6:
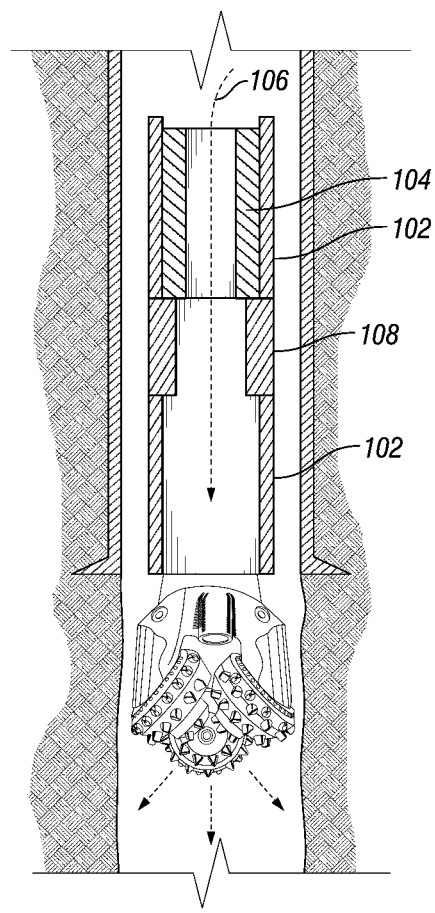
FIG. 6 is an illustration of a cylindrical body in a wellbore at a landing feature.
Figure 7:
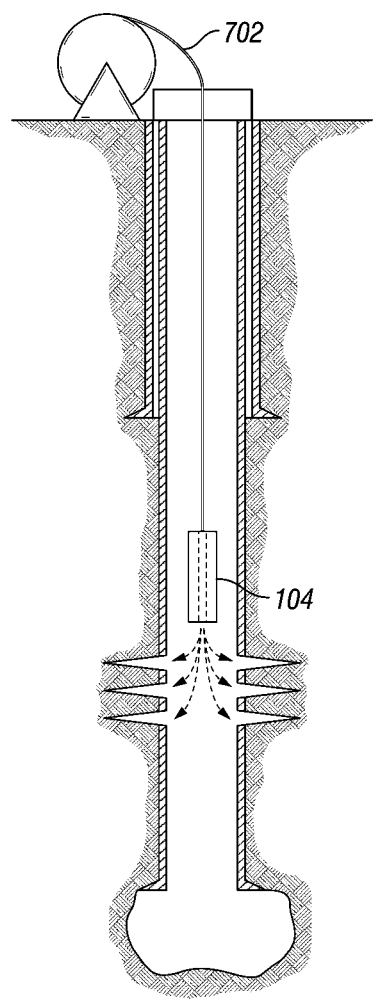
FIG. 7 is a schematic diagram of an alternate embodiment of a system for delivering a chemical to a downhole location in a wellbore.
Figure 8:
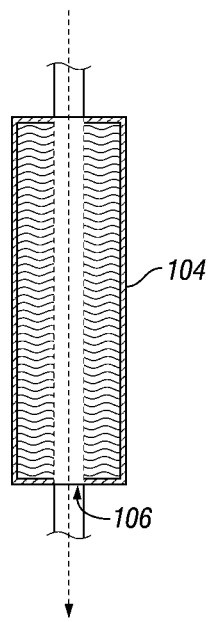
FIG. 8 is an illustration of a cylindrical body.

Referencing FIG. 6, a for-purpose landing sub 108 is provided which can be utilized where the use of a cylindrical body 104 having a treatment chemical is anticipated before the fluid conduit 102 is inserted into the wellbore. Referencing FIG. 7, in certain embodiments the cylindrical body 104 is attached to a coiled tubing 702, and an amount of the coiled tubing 702 is positioned in the wellbore to place the cylindrical body 104 at a specified position within the wellbore. The use of coiled tubing 702 allows the placement of the cylindrical body 104 and treatment chemical at any position in the wellbore without having to position or utilize a previously positioned landing feature 108. Where coiled tubing 702 is utilized, the cylindrical body 104 may be included with a specially designed canister holder, such as a sub designed to hold the canister on the end of the coiled tubing. A canister holder may also be included with a workover string, drill pipe, etc. In certain embodiments, a basket-like sub (not shown) may be screwed on to the end of a treatment string, with the cylindrical body placed inside the basket prior to running into the hole. In the embodiment of FIG. 7, the coiled tubing 702 further serves as the fluid conduit 102. In one example, FIG. 8 illustrates an assembly that attaches to the coiled tubing 702 including the cylindrical body 104.

One exemplary embodiment is a chemical delivery kit, including a chemical cartridge (not shown) that includes a cylindrical body 104. The chemical cartridge may further include a covering for the cylindrical body 104, where the covering may be positioned into the wellbore as part of the cylindrical body 104, or the cylindrical body 104 may be removed from the casing before positioning into the wellbore. The cylindrical body 104 includes a treatment chemical embedded in a soluble substrate, where the cylindrical body 104 has a flow channel 106 therethrough and an outer diameter sized to fit within a fluid conduit 102 of the wellbore. The treatment chemical includes a polymer cross-linker, a fluid breaker, an encapsulated chemical, a coated chemical, a chemical that forms or contributes to formation of a fluid loss pill, bentonite, xanthan, and/or a polyacrylamide.

In certain embodiments, the kit further includes the chemical cartridge having an activation coating responsive to an activator to expose the soluble substrate to fluid pumped through the flow channel 106. Certain embodiments of the kit include an amount of the activator for the activation coating. The amount of the activator includes a pH reducing agent, a pH elevating agent, a solvent, and/or an abrasive. The activator may be included in a form structured for ease of dispensing into a fluid pumped into the wellbore, such as powder in a bag or bucket that can be added at a blender tub by an operator when it is desired that the treatment chemical be released from the cylindrical body 104.

Exemplary embodiments of the kit include a flow channel 106 having a shape such as a venturi, an orifice, at least one rifling groove, and/or a turbulence-inducing flow channel shape. Certain embodiments of the kit include the chemical cartridge having a burst disk that blocks fluid flow through the flow channel, and/or a plurality of chemical cartridges where each of the cartridges can include a distinct treatment chemical and/or treatment chemicals that are released under distinct activation conditions.

A chemical delivery kit including a chemical cartridge as described herein provides for a portable and complete response kit that is ready-to-use in the event of a lost circulation event or other rapid-response situation. The chemical cartridge(s) can be delivered into the wellbore by dropping it down the wellbore (e.g. where the well is balanced) or by using an injector (e.g. similar to a cement plug injector), and the activator, where needed, is added to the fluid flowing through the flow channel 106 when the treatment chemical is to be utilized.

A technique for chemical deliver downhole is described. The technique includes an operation to form a cylindrical body including a treatment chemical, where the cylindrical body includes a flow channel therethrough. The technique includes an operation to position the cylindrical body into a fluid conduit of a wellbore, and an operation to flow a release fluid through the flow channel, thereby releasing at least a portion of the treatment chemical into the release fluid. In certain embodiments, the technique includes an operation to shape the flow channel into a shape that is a venturi, an orifice, at least one rifling groove, and/or a turbulence-inducing flow channel shape.

In certain embodiments, the operation to release the treatment chemical includes an operation to dissolve the treatment chemical into the release fluid and/or to remove a coating in the flow channel where the removed coating exposes the treatment chemical, and/or a substrate supporting the treatment chemical, to the release fluid. The operation to remove the coating includes varying a pH value of the release fluid where the coating is responsive to the pH value, including an abrasive material in the release fluid that removes at least part of the coating, and/or providing a release fluid wherein the coating is soluble in the release fluid. The operations utilizing the release fluid may include utilizing varying release fluids in multiple steps or stages, including varying pH values, varying temperature values, and/or varying compositions of the release fluid. In one example, an activator that removes a coating is included in a part of the release fluid, and the remaining release fluid dissolves the exposed treatment chemical.

The exemplary technique includes an operation to fluidly isolate fluids above the cylindrical body from fluids below the cylindrical body during the positioning, an operation to prevent fluid flow through the flow channel with a burst disk, and an operation to apply a pressure differential at the burst disk to allow fluid flow through the flow channel. The technique further includes an operation to position the cylindrical body by landing the cylindrical body on a landing sub in the wellbore. Certain embodiments of the technique include operations to determine that a lost circulation condition is present, and to perform the positioning and flowing in response to the lost circulation condition. The treatment chemical may include a pre-cursor for a lost circulation pill.

In certain embodiments, the technique includes an operation to provide at least part of the treatment chemical as an encapsulated chemical, and an operation to release the encapsulated chemical into a formation fluidly coupled to the wellbore. In certain embodiments, the technique further includes an operation to form a second cylindrical body having a second treatment chemical, where the treatment chemical releases in response to a first release operation, and where the second treatment chemical releases in response to a second release operation. The technique further includes an operation to selectively release the treatment chemical or the second treatment chemical by performing the first release operation or the second release operation. The technique further includes an operation to attach the cylindrical body to a coiled tubing, and to deliver the cylindrical body to a specified depth with the coiled tubing.

Another exemplary embodiment is another technique to deliver a chemical downhole. The technique includes an operation to determine that a lost circulation condition, or other high fluid loss situation, is present in a wellbore, and actions to perform operations in response to the lost circulation condition (or high fluid loss situation). The determination of a high fluid loss or lost circulation condition is a mechanical step for one of skill in the art and is not further discussed herein.

The operations in response to the lost circulation condition (or high fluid loss situation) include positioning a cylindrical body into a fluid conduit of a wellbore, where the cylindrical body includes a treatment chemical, flowing a release fluid through the flow channel, thereby releasing at least a portion of the treatment chemical into the release fluid, and forming a fluid loss pill with the released treatment chemical. The operation to release the treatment chemical includes a release operation such as dissolving the least the portion of the treatment chemical into the release fluid, removing a coating in the flow channel, where the coating is responsive to a pH value of the release fluid, and/or removing a coating in the flow channel, wherein the coating is responsive to an abrasive material included in the release fluid. Certain embodiments of the technique include an operation to land the cylindrical body on a landing feature such as a drill bit, a landing sub, or a tubing internal upset. In certain embodiments, the operations of positioning, flowing, and forming are performed with a drill string present in the wellbore. For example, if a high fluid loss situation is identified during drilling, the technique to deliver the chemical downhole may be performed without pulling the drilling string from the well.

As is evident from the figures and text presented above, a variety of embodiments are contemplated.

An exemplary method includes forming a cylindrical body including a treatment chemical, where the cylindrical body includes a flow channel therethrough. The method includes positioning the cylindrical body into a fluid conduit of a wellbore, and flowing a release fluid through the flow channel, thereby releasing at least a portion of the treatment chemical into the release fluid.

Certain embodiments of the method include one or more of the operations described following. Operations described may be substituted, replaced, re-ordered, divided, and/or grouped in various embodiments. The exemplary method includes shaping the flow channel into a shape comprising a venturi, an orifice, at least one rifling groove, and a turbulence-inducing flow channel shape. In certain embodiments, the releasing of the treatment chemical includes dissolving the least the portion of the treatment chemical into the release fluid and/or removing a coating in the flow channel where the removed coating exposes the treatment chemical (and/or a substrate supporting the treatment chemical) to the release fluid. The coating may be removed by varying a pH value of the release fluid where the coating is responsive to the pH value, by including an abrasive material in the release fluid that removes at least part of the coating, and/or by providing a release fluid wherein the coating is soluble in the release fluid. The release fluid may include multiple steps or stages, including varying pH values, temperature value, and compositions. In one example, an activator that removes a coating is included in a part of the release fluid, and the remaining release fluid (which may be a base fluid, or an unmodified fluid) dissolves the exposed treatment chemical.

The exemplary method includes fluidly isolating fluids above the cylindrical body from fluids below the cylindrical body during the positioning, preventing fluid flow through the flow channel with a burst disk and applying a pressure differential at the burst disk to break the burst disk and to allow fluid flow through the flow channel, and/or positioning the cylindrical body by landing the cylindrical body on a landing sub in the wellbore. Certain embodiments of the method include determining that a lost circulation condition is present, and performing the positioning and flowing in response to the lost circulation condition, where the treatment chemical includes a pre-cursor for lost circulation pill.

The method includes providing at least part of the treatment chemical as an encapsulated chemical, and releasing the encapsulated chemical into a formation fluidly coupled to the wellbore. The method further includes forming a second cylindrical body having a second treatment chemical, where at least part of the treatment chemical releases in response to a first release operation, and where at least part of the second treatment chemical releases in response to a second release operation. The method further includes selectively releasing the treatment chemical or the second treatment chemical by performing the first release operation or the second release operation. The method further includes attaching the cylindrical body to a coiled tubing, and delivering the cylindrical body to a specified depth with the coiled tubing.

Another exemplary embodiment is a system including a fluid conduit of a wellbore, and a cylindrical body that includes a treatment chemical, a flow channel therethrough, and an outer diameter sized to fit within the fluid conduit. The system further includes a pump fluidly coupled to the fluid conduit on a downstream side and fluidly coupled to a release fluid on an upstream side, wherein the release fluid releases at least part of the treatment chemical in response to the pump delivering the release fluid through the flow channel. Certain embodiments of the system include one or more of the elements described following. Elements described may be substituted, replaced, re-ordered, divided, and/or grouped in various embodiments.

The system includes the cylindrical body consisting of the treatment chemical and a soluble substrate, and an activation coating, responsive to an activator, exposes the soluble substrate in response to the release fluid flowing through the flow channel. The release fluid at least partially exposes the treatment chemical and soluble substrate. In certain embodiments, the release fluid includes a solvent and the cylindrical body is a material soluble in the solvent. In certain embodiments, the release fluid includes a lowered pH, an elevated pH, a solvent, and/or an abrasive. In further embodiments, the system includes a burst disk blocking fluid flow through the flow channel. The cylindrical body can include fluid sealing members that fluidly isolate fluids above the cylindrical body from fluids below the cylindrical body. The fluid sealing members may include fins or gaskets, and the fluid sealing members may be formed from the treatment chemical and/or a soluble substrate.

The system further includes a landing feature disposed in the fluid conduit, where the landing feature allows passage of fluid but does not allow passage of the cylindrical body while the cylindrical body remains intact. The landing feature includes any feature allowing the cylindrical body to land, or flow down the wellbore to the position of the feature but not past the feature, and includes a drill bit, a landing sub, or a tubing internal upset. The treatment chemical may be a polymer cross-linker, a fluid breaker, an encapsulated chemical, a coated chemical, a chemical that contributes to the formation of (or that forms) a fluid loss pill in the release fluid, and/or a polyacrylamide. In certain embodiments, the cylindrical body is attached to a coiled tubing, and an amount of the coiled tubing is positioned in the wellbore to place the cylindrical body at a specified position within the wellbore.

An exemplary embodiment is a chemical delivery kit, including a chemical cartridge that includes a cylindrical body. The cylindrical body includes a treatment chemical embedded in a soluble substrate, where the cylindrical body has a flow channel therethrough and an outer diameter sized to fit within a fluid conduit of a wellbore. The treatment chemical includes a polymer cross-linker, a fluid breaker, an encapsulated chemical, a coated chemical, a chemical that forms or contributes to formation of a fluid loss pill, and/or a polyacrylamide. The exemplary kit further includes the chemical cartridge having an activation coating responsive to an activator to expose the soluble substrate to fluid pumped through the flow channel, and the chemical delivery kit further includes an amount of the activator that is an activator including a pH reducing agent, a pH elevating agent, a solvent, and/or an abrasive. The kit includes the flow channel having a shape such as a venturi, an orifice, at least one rifling groove, and/or a turbulence-inducing flow channel shape. Certain embodiments of the kit include the chemical cartridge having a burst disk that blocks fluid flow through the flow channel, and/or a plurality of chemical cartridges where each of the cartridges can include a distinct treatment chemical.

Another exemplary embodiment is a method including determining that a lost circulation condition is present in a wellbore, and performing operations in response to the lost circulation condition. The operations include positioning a cylindrical body into a fluid conduit of a wellbore, where the cylindrical body includes a treatment chemical, flowing a release fluid through the flow channel, thereby releasing at least a portion of the treatment chemical into the release fluid, and forming a fluid loss pill with the released treatment chemical. The operation to release the treatment chemical includes a release operation such as dissolving the at least the portion of the treatment chemical into the release fluid, removing a coating in the flow channel where the coating is responsive to a pH value of the release fluid, and/or removing a coating in the flow channel where the coating is responsive to an abrasive material included in the release fluid. Certain embodiments of the method include landing the cylindrical body on a landing feature such as a drill bit, a landing sub, or a tubing internal upset. In certain embodiments, the operations of positioning, flowing, and forming are performed with a drill string present in the wellbore.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   forming a cylindrical body, the cylindrical body comprising a treatment chemical, a solid, continuous outer surface and an open flow channel therethrough;
   positioning the cylindrical body into a fluid conduit; and
   flowing a release fluid through the cylindrical body via the flow channel, thereby releasing at least a portion of the treatment chemical into the release fluid;
   wherein the flow channel is formed within the cylindrical body prior to the releasing at least a portion of the treatment chemical.

2. The method of claim 1, wherein the fluid conduit is a fluid conduit from a wellbore.

3. The method of claim 1, further comprising shaping the flow channel into a shape comprising a venturi, an orifice, at least one rifling groove, and a turbulence-inducing flow channel shape.

4. The method of claim 1, wherein the releasing at least the portion of the treatment chemical comprises a release operation selected from the release operations consisting of:
   dissolving at least a portion of the treatment chemical into the release fluid;
   removing a coating in the flow channel, wherein the coating is responsive to a pH value of the release fluid; and
   removing a coating in the flow channel, wherein the coating is responsive to an abrasive material included in the release fluid.

5. The method of claim 1, further comprising fluidly isolating fluids above the cylindrical body from fluids below the cylindrical body during the positioning.

6. The method of claim 1, further comprising preventing fluid flow through the flow channel with a burst disk, and applying a pressure differential at the burst disk to allow fluid flow through the flow channel.

7. The method of claim 1, wherein the positioning comprises landing the cylindrical body on a landing sub in a wellbore.

8. The method of claim 1, further comprising determining that a lost circulation condition is present, and performing the positioning and flowing in response to the lost circulation condition, wherein the treatment chemical comprises a precursor for lost circulation pill.

9. The method of claim 1, further comprising providing at least a second portion of the treatment chemical as an encapsulated chemical, and releasing the encapsulated chemical into a formation fluidly coupled to a wellbore in response to the releasing at least the portion of the treatment chemical into the release fluid.

10. The method of claim 1, further comprising forming a second cylindrical body comprising a second treatment chemical, wherein at least a portion of the treatment chemical releases in response to a first release operation, wherein at least a portion of the second treatment chemical releases in response to a second release operation, the method further comprising selectively releasing one of: the treatment chemical, and the second treatment chemical; by performing one of the first release operation and the second release operation.

11. The method of claim 1, further comprising attaching the cylindrical body to a coiled tubing, and delivering the cylindrical body to a specified depth with the coiled tubing.

12. A system, comprising:
    a fluid conduit of a wellbore;
    a cylindrical body comprising:
      a treatment chemical;
      a solid, continuous outer surface;

a flow channel positioned therethrough such that the treatment chemical surrounds the flow channel; and
an outer diameter sized to fit within the fluid conduit; and
a pump fluidly coupled to the fluid conduit on a downstream side and fluidly coupled to a release fluid on an upstream side, wherein the release fluid is structured to release at least a portion of the treatment chemical in response to the pump delivering the release fluid through the flow channel;
wherein the flow channel is positioned within the cylindrical body prior to the releasing at least a portion of the treatment chemical.

13. The system of claim 12, wherein the cylindrical body consists of the treatment chemical and a soluble substrate.

14. The system of claim 13, further comprising an activation coating responsive to an activator to expose the soluble substrate in response to the release fluid flowing through the flow channel.

15. The system of claim 12, wherein the release fluid comprises a solvent and the cylindrical body comprises a material soluble in the solvent.

16. The system of claim 12, further comprising a burst disk blocking fluid flow through the flow channel.

17. The system of claim 12, wherein the cylindrical body further comprises fluid sealing members structured to fluidly isolate fluids above the cylindrical body from fluids below the cylindrical body.

18. The system of claim 12, further comprising a landing feature disposed in the fluid conduit, wherein the landing feature allows passage of fluid but does not allow passage of the cylindrical body while the cylindrical body remains intact.

19. The system of claim 18, wherein the landing feature comprises a feature selected from the features consisting of: a drill bit, a landing sub, a tubing internal upset, a temporary landing tool, and a retrievable landing tool.

20. The system of claim 12, wherein the treatment chemical comprises at least one chemical selected from the chemicals consisting of a polymer cross-linker, a fluid breaker, an encapsulated chemical, a coated chemical, a chemical structured to form a fluid loss pill in the release fluid, and a polyacrylamide.

21. The system of claim 12, wherein the cylindrical body is attached to a coiled tubing, and wherein an amount of the coiled tubing is positioned in the wellbore.

22. The system of claim 12, wherein the release fluid comprises at least one release feature selected from the features consisting of: a lowered pH, an elevated pH, a solvent, and an abrasive.

23. A chemical delivery kit, comprising:
a chemical cartridge comprising a cylindrical body having a solid, continuos outer surface and an open flow channel formed therethrough prior to delivery into a wellbore, the cylindrical body comprising a treatment chemical embedded in a soluble substrate around the open flow channel, the cylindrical body having an outer diameter sized to fit within a fluid conduit of a wellbore; and
the treatment chemical comprising at least one chemical selected from the chemicals consisting of a polymer cross-linker, a fluid breaker, an encapsulated chemical, a coated chemical, a chemical structured to form a fluid loss pill, bentonite, xanthan, and a polyacrylamide, the at least one chemical being selectively released by flowing fluid through the cylindrical body via the open flow channel.

24. The chemical delivery kit of claim 23, wherein the chemical cartridge further comprises an activation coating responsive to an activator to expose the soluble substrate to fluid pumped through the flow channel, the chemical delivery kit further comprising an amount of the activator comprising at least one activator selected from the activators consisting of: a pH reducing agent, a pH elevating agent, a solvent, and an abrasive.

25. The chemical delivery kit of claim 23, wherein the flow channel comprises a shape selected from the shapes consisting of: a venturi, an orifice, at least one rifling groove, and a turbulence-inducing flow channel shape.

26. The chemical delivery kit of claim 23, wherein the chemical cartridge further comprises a burst disk blocking fluid flow through the flow channel.

27. The chemical delivery kit of claim 23, further comprising a plurality of chemical cartridges.

28. The chemical delivery kit of claim 27, wherein each of the plurality of chemical cartridges comprises a distinct treatment chemical.

29. A method, comprising:
determining that a high fluid loss situation is present in a wellbore, and, in response to the high fluid loss situation:
positioning a cylindrical body into a fluid conduit of a wellbore, the cylindrical body comprising a treatment chemical, a solid, continuous outer surface and a flow channel therethrough;
flowing a release fluid through the cylindrical body via the flow channel, thereby releasing at least a portion of the treatment chemical into the release fluid; and
forming a fluid loss pill with the released treatment chemical;
wherein the flow channel is formed within the cylindrical body prior to the releasing at least a portion of the treatment chemical.

30. The method of claim 29, wherein the releasing at least the portion of the treatment chemical comprises a release operation selected from the release operations consisting of:
dissolving the least the portion of the treatment chemical into the release fluid;
removing a coating in the flow channel, wherein the coating is responsive to a pH value of the release fluid; and
removing a coating in the flow channel, wherein the coating is responsive to an abrasive material included in the release fluid.

31. The method of claim 29, further landing the cylindrical body on a landing feature selected from the features consisting of: a drill bit, a landing sub, a tubing internal upset, a temporary landing tool, and a retrievable landing tool.

32. The method of claim 29, wherein the positioning, the flowing, and the forming are performed with a drill string present in the wellbore.

\* \* \* \* \*